(12) United States Patent
Medhurst et al.

(10) Patent No.: US 9,009,616 B2
(45) Date of Patent: Apr. 14, 2015

(54) METHOD AND SYSTEM FOR CONFIGURING A SEQUENCE OF POSITIONS OF A CAMERA

(75) Inventors: Kirsten A. Medhurst, Fresno, CA (US); Myles Daniel Bostwick, Fort Collins, CO (US)

(73) Assignee: Pelco, Inc., Clovis, CA (US)

( * ) Notice: Subject to any disclaimer, the term of this patent is extended or adjusted under 35 U.S.C. 154(b) by 718 days.

(21) Appl. No.: 13/245,332

(22) Filed: Sep. 26, 2011

(65) Prior Publication Data

US 2012/0079406 A1    Mar. 29, 2012

Related U.S. Application Data

(60) Provisional application No. 61/386,404, filed on Sep. 24, 2010.

(51) Int. Cl.
| | | |
|---|---|---|
| G06F 3/048 | (2013.01) | |
| G06F 15/177 | (2006.01) | |
| G06F 3/00 | (2006.01) | |
| H04N 5/232 | (2006.01) | |
| G06F 3/0486 | (2013.01) | |
| G08B 13/196 | (2006.01) | |
| H04N 5/247 | (2006.01) | |
| H04N 7/18 | (2006.01) | |

(52) U.S. Cl.
CPC .......... *H04N 5/23216* (2013.01); *G06F 3/0486* (2013.01); *G08B 13/1968* (2013.01); *H04N 5/247* (2013.01); *H04N 7/181* (2013.01)

(58) Field of Classification Search
None
See application file for complete search history.

(56) References Cited

U.S. PATENT DOCUMENTS

| | | | | |
|---|---|---|---|---|
| 4,945,367 | A  * | 7/1990 | Blackshear | 396/427 |
| 6,538,663 | B2 * | 3/2003 | Kamei | 345/635 |
| 7,554,576 | B2 * | 6/2009 | Erol et al. | 348/211.3 |
| 7,683,940 | B2 * | 3/2010 | Fleming | 348/222.1 |
| 2002/0049979 | A1 * | 4/2002 | White et al. | 725/87 |
| 2002/0167541 | A1 | 11/2002 | Ando et al. | |
| 2005/0100087 | A1 * | 5/2005 | Hasegawa et al. | 375/240.01 |
| 2008/0155421 | A1 | 6/2008 | Ubillos et al. | |
| 2008/0215983 | A1 | 9/2008 | Wierowski et al. | |
| 2009/0024963 | A1 * | 1/2009 | Lindley et al. | 715/839 |
| 2009/0288011 | A1 * | 11/2009 | Piran et al. | 715/720 |
| 2010/0212024 | A1 | 8/2010 | Marchese | |
| 2010/0220197 | A1 | 9/2010 | Dukellis et al. | |

OTHER PUBLICATIONS

International Preliminary Report on Patentability, PCT/US2011/053308, "Method and System for Configuring a Sequence of Positions of a Camera," date of mailing Jun. 20, 2013.
International Search Report and Written Opinion, PCT/US2011/053308, "Method and System for Configuring a Sequence of Positions of a Camera," date of mailing Feb. 22, 2013.

\* cited by examiner

*Primary Examiner* — Stephen Alvesteffer
(74) *Attorney, Agent, or Firm* — Hamilton, Brook, Smith & Reynolds, P.C.

(57) ABSTRACT

A method of configuring a camera to view a sequence of positions comprising the steps of displaying a graphical user interface, displaying a plurality of thumbnails on the graphical user interface with the plurality of thumbnails having associated respective positions of the camera and the respective thumbnails in the plurality of thumbnails providing the field of view of the camera in the respective positions, providing a workspace on the graphical user interface, enabling a user to drag and drop thumbnails to the workspace, and creating a tour for the camera based on the thumbnails in the workspace.

20 Claims, 21 Drawing Sheets

METHOD AND SYSTEM FOR CONFIGURING A SEQUENCE OF POSITIONS OF A CAMERA

CROSS-REFERENCE TO RELATED APPLICATION

This application is related to and claims the benefit of U.S. Provisional Patent Application Ser. No. 61/386,404 filed Sep. 24, 2010, entitled METHOD AND APPARATUS FOR CONFIGURING A SEQUENCE OF POSITIONS OF A VIDEO SURVEILLANCE CAMERA, the entirety of which is incorporated herein by reference.

BACKGROUND

The present application pertains generally to video surveillance and, in particular, to configuring a sequence of camera positions, known in the art as a tour or pattern, of a camera.

Ordinarily a user configures a security camera tour by selecting from a list of named presets; however, it can be difficult to convey the view from a camera using words alone. Another option is to manually move the camera through the sequence by using the pan, tilt, and zoom controls and pause at each position. This procedure is difficult to time precisely, and if the operator makes an error, he must start over and rerecord the pattern from the beginning, which is both frustrating and inefficient. In addition, this method does not allow the user to modify the pattern after it has been recorded, thereby creating further frustration and inefficiency if the pattern must be changed, even if the change is minor.

Accordingly, there has been a need in the art for a method and system of configuring a sequence of camera positions that provides ease of use and efficiency. Moreover, there has been a need in the art for a method of easily modifying an existing camera pattern.

SUMMARY

An example of a method of configuring a camera to view a sequence of positions includes the steps of displaying a graphical user interface, displaying a plurality of thumbnails on the graphical user interface with the plurality of thumbnails having associated respective positions of the camera and the respective thumbnails in the plurality of thumbnails providing the field of view of the camera in the respective positions, providing a workspace on the graphical user interface, enabling a user to drag and drop thumbnails to the workspace, and creating a tour for the camera based on the thumbnails in the workspace.

Implementations of such a method may include one or more of the following features. Creating a tour for the camera based on the thumbnails in the workspace includes creating a tour for the camera based on the thumbnails in the workspace and the order of the thumbnails. The method further includes enabling a user to drag and drop the thumbnails in the workspace to change the order of the presets in the tour for the camera. The method further includes receiving input from a user to delete a selected thumbnail in the workspace and deleting the selected thumbnail in the workspace thereby deleting the preset from the tour. The method further includes saving the tour based on user input. The method further includes receiving user input to open a tour that has been saved and opening a tour based on the received user input by displaying thumbnails of the presets in the tour in the workspace. The method further includes changing the tour that has been opened based on the received user input by enabling a user to modify the preset order of the tour by dragging and dropping the thumbnails displayed in the workspace. The method further includes adding a preset to the tour that has been opened based on the received user input by enabling a user to drag and drop a thumbnail displayed on the graphical user interface in the workspace. The method further includes removing a preset from a tour that has been opened based on the received user input by receiving user input indicating which thumbnail in the workspace has been selected by the user.

An example of a system for configuring a camera to view a sequence of positions includes a processor, a display connected to the processor, an input/output device adapted to communicate with a camera, and a user input device, the processor being adapted to generate a signal to display a graphical user interface on the display with a plurality of thumbnails associated with a camera in communication with the input/output device, the thumbnails having associated respective positions of the camera and the thumbnails providing the field of view of the camera in the respective positions, the processor being further adapted to provide a workspace on the graphical user interface and to enable a user to use the user input device to drag and drop thumbnails in the workspace thereby creating a tour for the camera based on the thumbnails in the workspace.

Implementations of such a system may include one or more of the following features. The processor is adapted to create a tour for the camera based on the order of the thumbnails in the workspace. The processor enables a user to use the user input device to drag and drop the thumbnails in the workspace thereby changing the order of the presets in the tour for the camera. The processor is adapted to delete a preset from the tour in response to a preset being selected by a user and an indication that the preset should be deleted. The processor is adapted to open a tour and enable a user to modify the tour by using the user input device.

An example of a non-transitory computer readable medium includes instructions configured to cause a processor to display a graphical user interface, to display a plurality of thumbnails on the graphical user interface with the plurality of thumbnails having associated respective positions of the camera and the respective thumbnails in the plurality of thumbnails providing the field of view of the camera in the respective positions, to provide a workspace on the graphical user interface, to enable a user to drag and drop thumbnails to the workspace, and to create a tour for the camera based on the thumbnails in the workspace.

Implementations of such a non-transitory computer readable medium may include one or more of the following features. The instructions configured to cause the processor to create a tour for the camera based on the thumbnails in the workspace comprise instructions configured to cause the processor to create a tour for the camera based on the thumbnails in the workspace and the order of the thumbnails. The non-transitory computer readable medium further comprises instructions configured to cause the processor to enable a user to drag and drop the thumbnails in the workspace to change the order of the presets in the tour for the camera. The non-transitory computer readable medium further comprises instructions configured to cause the processor to receive input from a user to delete a selected thumbnail in the workspace and to delete the selected thumbnail in the workspace thereby deleting the preset from the tour. The non-transitory computer readable medium further comprises instructions configured to cause the processor to receive user input to open a tour and to open a tour based on the received user input by displaying thumbnails of the presets in the tour in the workspace. The non-transitory computer readable medium further comprises instructions configured to cause the processor to enable a user to modify a tour that has been opened by interacting with the thumbnails in the workspace.

Items and/or techniques described herein provide an accurate, effective, and flexible way to configure a camera tour and benefits over the prior art. In the initial configuration, a user can accurately choose the preset of interest, because he does not have to rely on ambiguous naming conventions. Rather, he can choose based on the scene visible in the thumbnail thereby achieving increased efficiency. Having the array of preset thumbnails available on the tour configuration page eliminates the extra step of calling up each preset to verify the scene before adding it.

In addition, a user also has more flexibility in creating and editing the tour. If he wants to insert a new preset in the middle of the tour, he can do so with ease, simply by dragging and dropping the new preset thumbnail into the desired position.

The processes and systems described herein, and the attendant advantages, applications, and features thereof, will be more fully understood by a review of the following detailed description, figures, and claims.

BRIEF DESCRIPTION OF THE DRAWINGS

FIG. 9 is an exemplary screen shot illustrating one embodiment for configuring preset tours.

FIG. 10 is an exemplary screen shot illustrating one embodiment for configuring preset tours.

FIG. 11 is an exemplary screen shot illustrating one embodiment for configuring preset tours.

FIG. 12 is an exemplary screen shot illustrating one embodiment for configuring preset tours.

FIG. 17 is an exemplary screen shot illustrating one embodiment for configuring preset tours.

FIG. 19 is an exemplary screen shot illustrating one embodiment for configuring preset tours.

FIG. 21 is an exemplary screen shot illustrating one embodiment for configuring preset tours.

DETAILED DESCRIPTION

Figure 1:
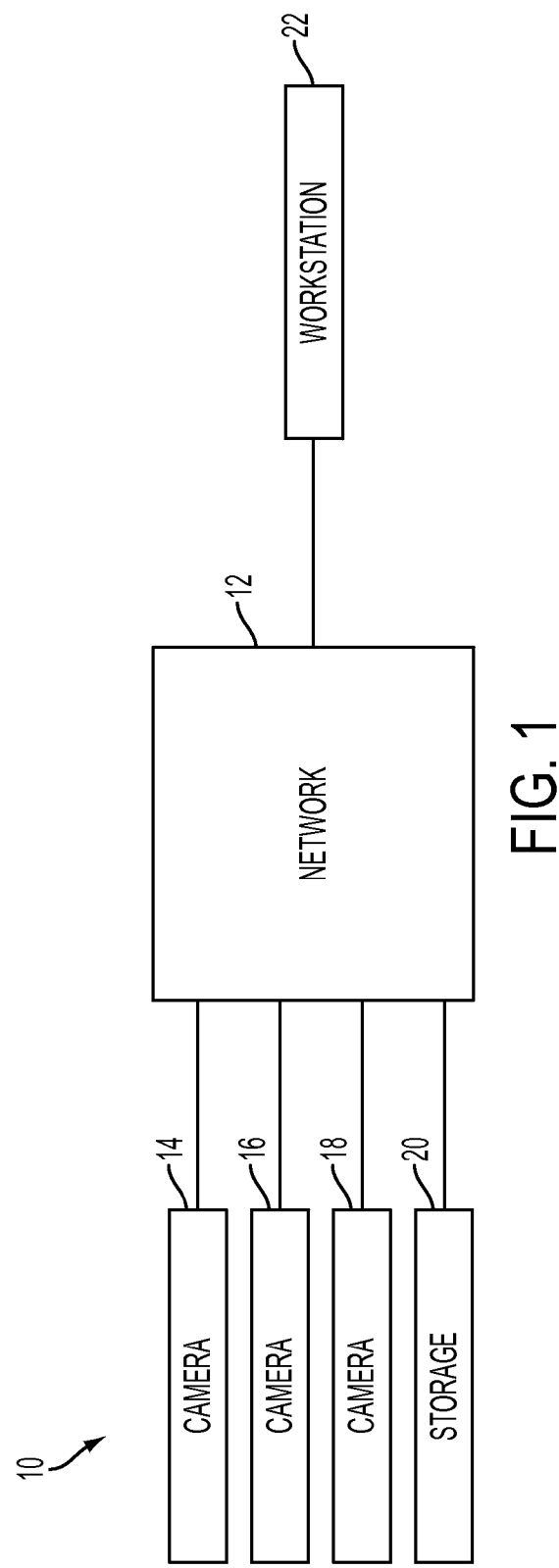
FIG. 1 is a block diagram of one embodiment of a surveillance system in which various aspects of configuring a camera can be implemented.

Referring to FIG. 1, a video surveillance system 10 has a network 12 which can be a closed network, local area network, or wide area network, such as the Internet. A plurality of cameras 14, 16, and 18 are connected to network 12 to provide real-time video streams. Workstation 22, which can be, for example, a control point in surveillance system 10, a personal computer or a user logged into surveillance system 10 by means of a laptop computer, is connected to network 12. Cameras 14, 16, and 18 provide video streams to workstation 22 via network 12. Storage 20 is connected to network 12 and can be part of another workstation, control point, network manager, system storage or other suitable device. One or more of cameras 14, 16, and 18 can be a movable camera, such as a PTZ camera that allows a user to adjust the pan, tilt, and zoom of the camera and can have their own storage for storing presets and tour information.

Figure 2:
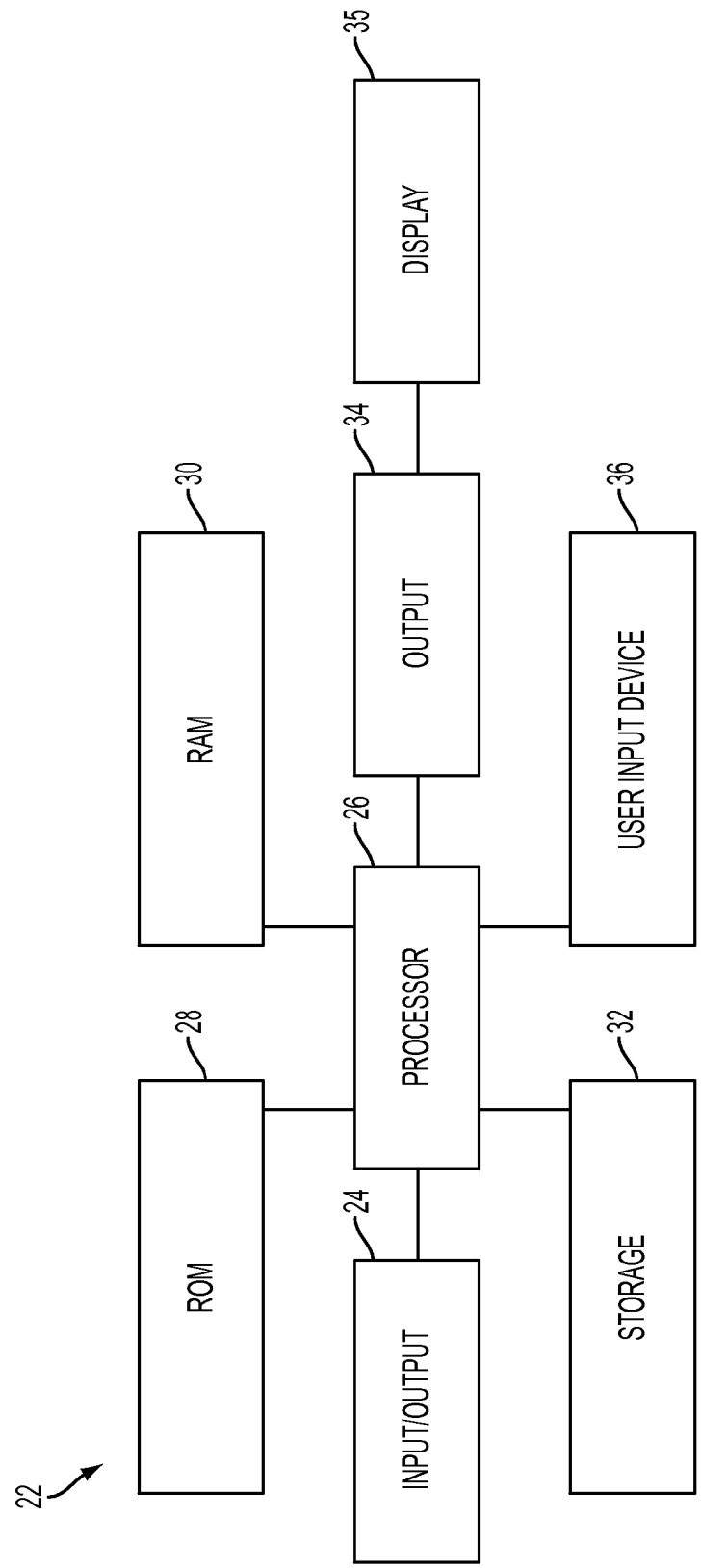
FIG. 2 is an exemplary block diagram of one embodiment of the workstation shown in FIG. 1.

With reference to FIG. 2, one embodiment of an exemplary workstation for performing various aspects of configuring a camera is shown in block diagram form. Workstation 22 has a central or host processor 26 which is connected to input/output 24, ROM 28, RAM 30, video display 35, storage 32 and user input device 36. User input device 36 can be a keyboard, mouse, controller, or other suitable input device. Processor 26 implements algorithms and programs that are stored in ROM 28, storage 32, which could be a disk drive for example, or storage 20, which is located elsewhere in network 12, in response to user input from user input device 36 and provides output signals to display 35. Input/output 24 is connected to network 12 to receive the video streams from cameras 14, 16, and 18, and to send configuration and control signals to cameras 14, 16, and 18 in FIG. 1. In addition, input/output 24 also can receive signals from storage 20, such as the algorithms to implement various aspects of configuring cameras 14, 16, and 18. The programs and algorithms stored, for example, in storage 32 are loaded at run time to enable a user to configure one or more of cameras 14, 16, and 18 and/or surveillance system 10 by interacting with the graphical user interface on display 35 with user input device 36.

Figure 3:
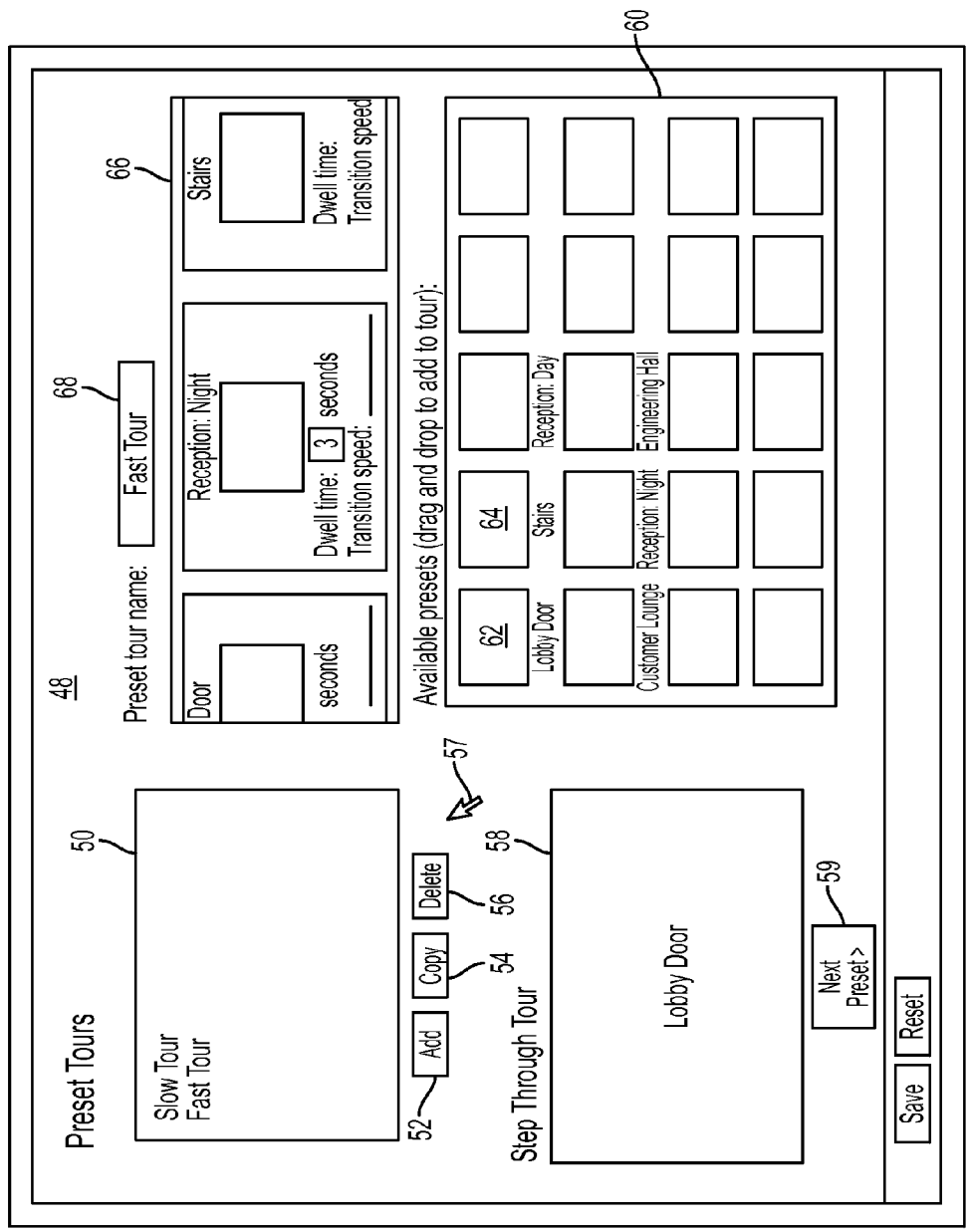
FIG. 3 is an exemplary screen shot illustrating one embodiment for configuring preset tours.

FIG. 3 shows an exemplary embodiment of a graphical user interface 48 for configuring preset tours that are displayed, for example, on display 35 in FIG. 2. Window 50 shows a list of preset tours, such as Slow Tour and Fast Tour, that have previously been created. Blocks or buttons 52, 54, and 56 allow a user to add, copy or delete a preset tour by using, for example a mouse to move pointer 57 and activate the buttons. Window 58 allows a user to step through a tour by using a mouse to select and click button 59 to get the next preset and to see the field of view of the camera. Window 60 contains a plurality of thumbnail images or views, such as Lobby Door 62 and Stairs 64 that are presets that are available for incorporating into a tour. The thumbnails are shown as merely empty rectangles to simplify the drawings. However, the thumbnail viewed on an actual display would be a miniature version of the image in the field of view of the camera in that preset position. These presets have been created previously by positioning the pan/tilt/zoom camera to a desired field of view, capturing an image of the field of view to use as a thumbnail image, naming the preset, and then saving the position setting, thumbnail and other associated information. The thumbnail is then displayed in window 60 in the same manner that Lobby Door 62 and Stairs 64 are displayed. Although the presets in window 60 have been named to assist a user in identifying the field of view of the camera in that particular pan, tilt, and zoom setting, naming of the preset is not required.

Figure 4:
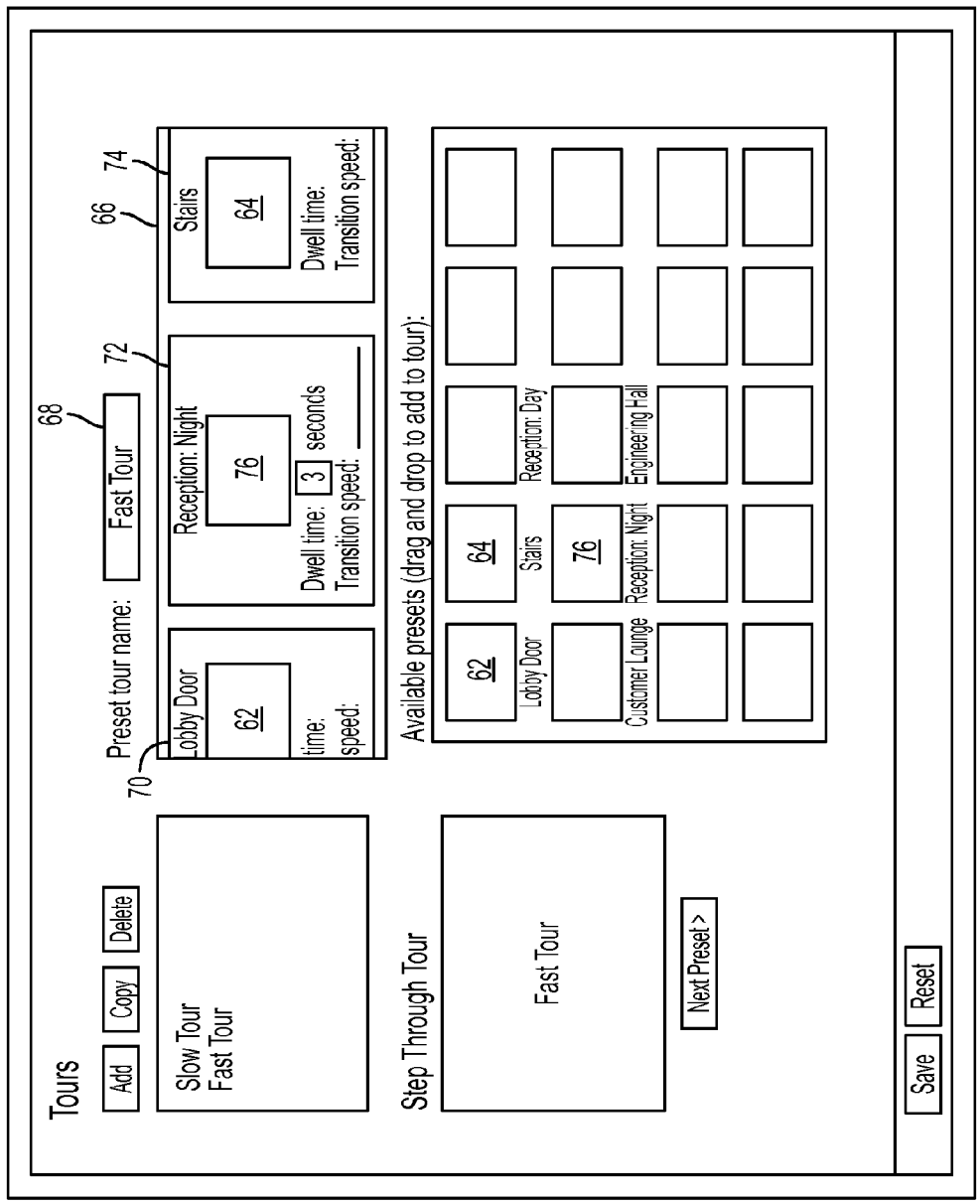
FIG. 4 is an exemplary screen shot illustrating one embodiment for configuring preset tours.
Figure 5:
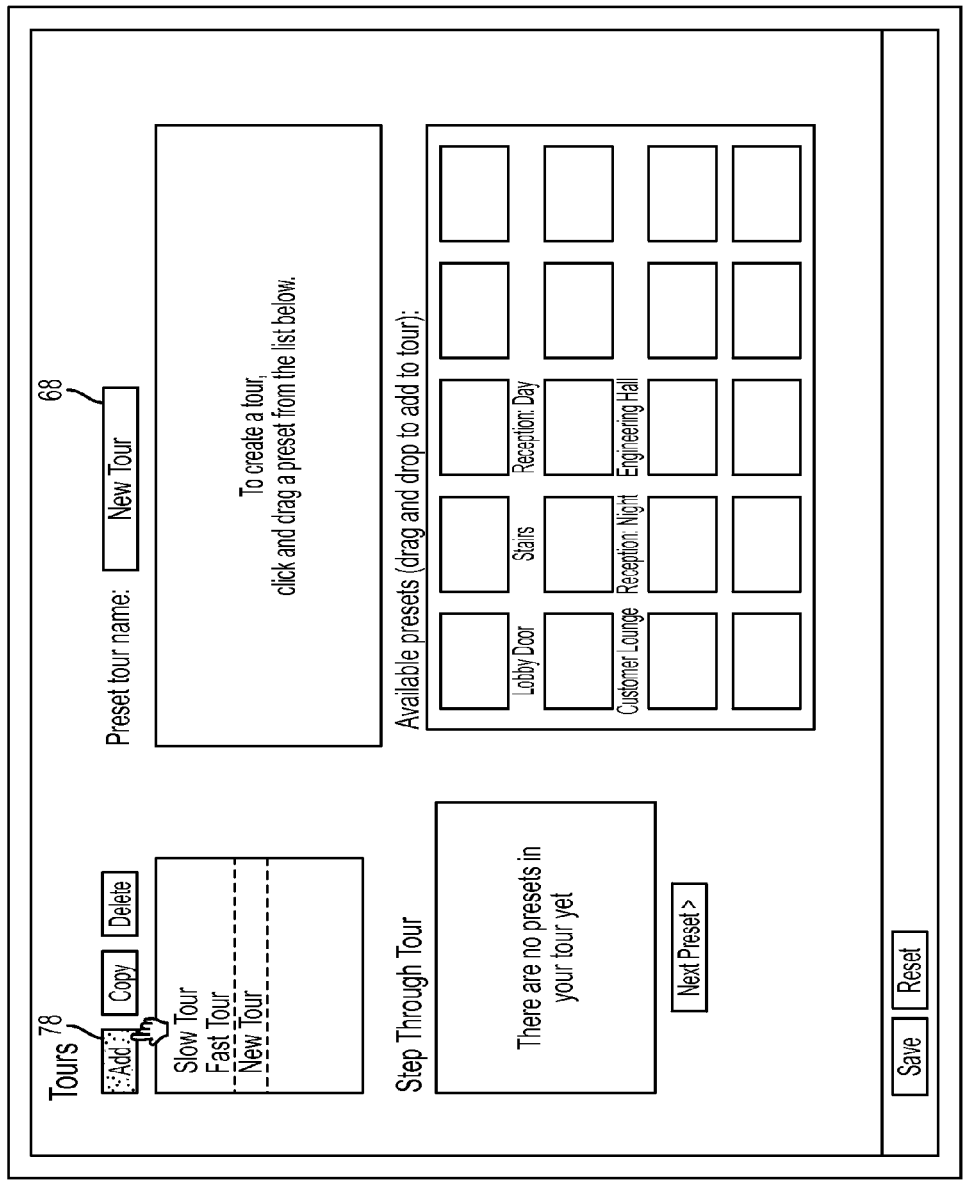
FIG. 5 is an exemplary screen shot illustrating one embodiment for configuring preset tours.
Figure 6:
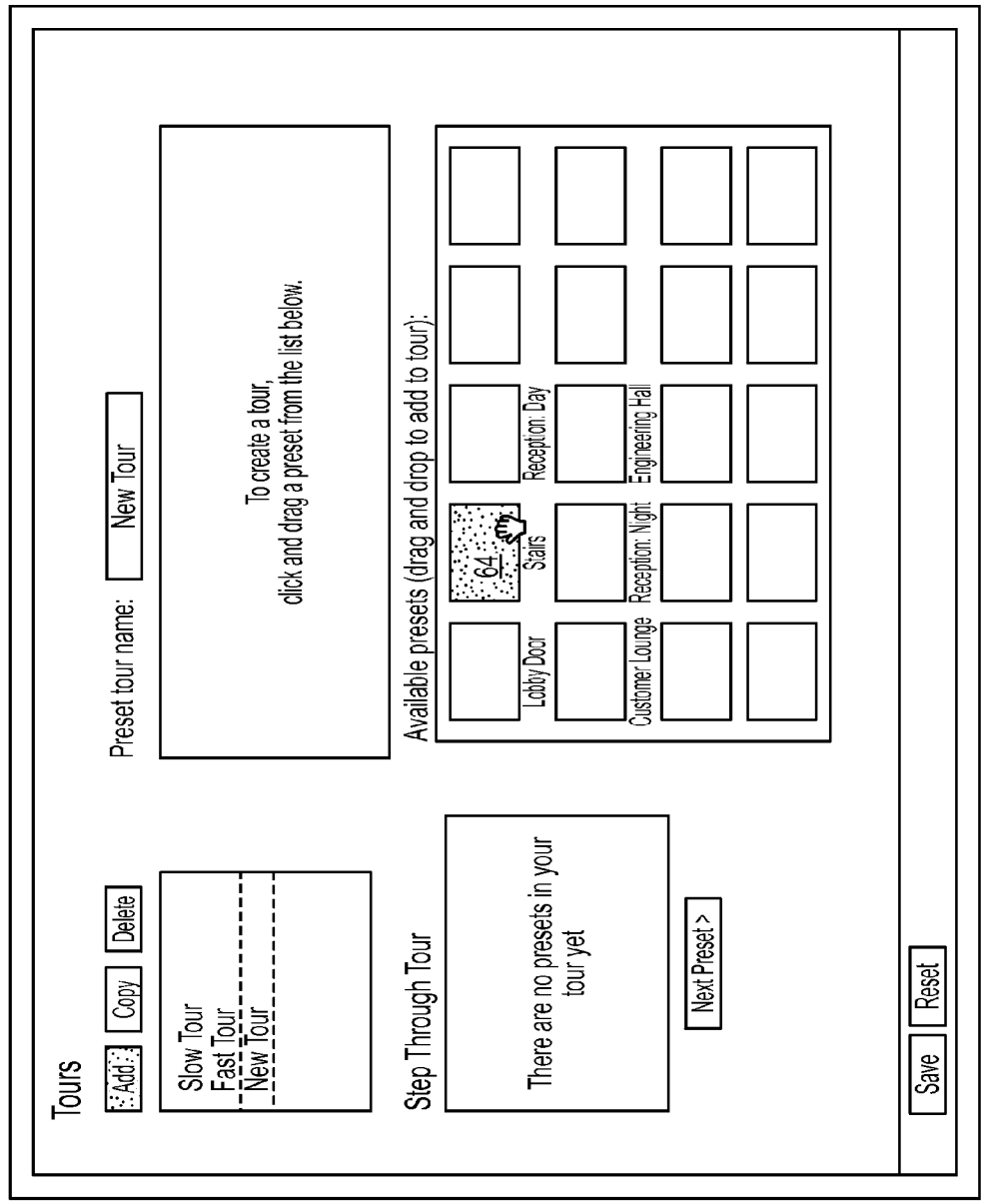
FIG. 6 is an exemplary screen shot illustrating one embodiment for configuring preset tours.
Figure 7:
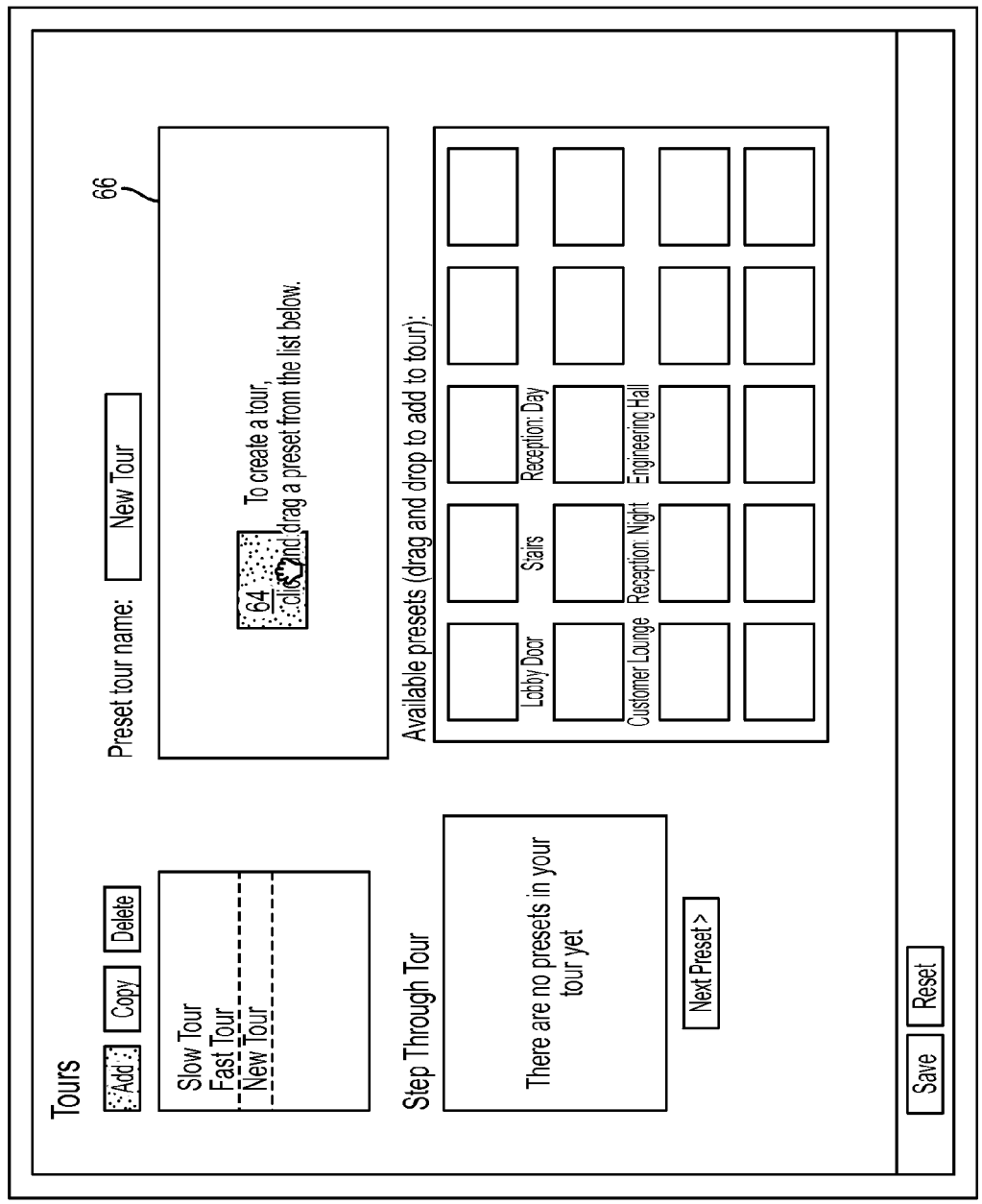
FIG. 7 is an exemplary screen shot illustrating one embodiment for configuring preset tours.
Figure 8:
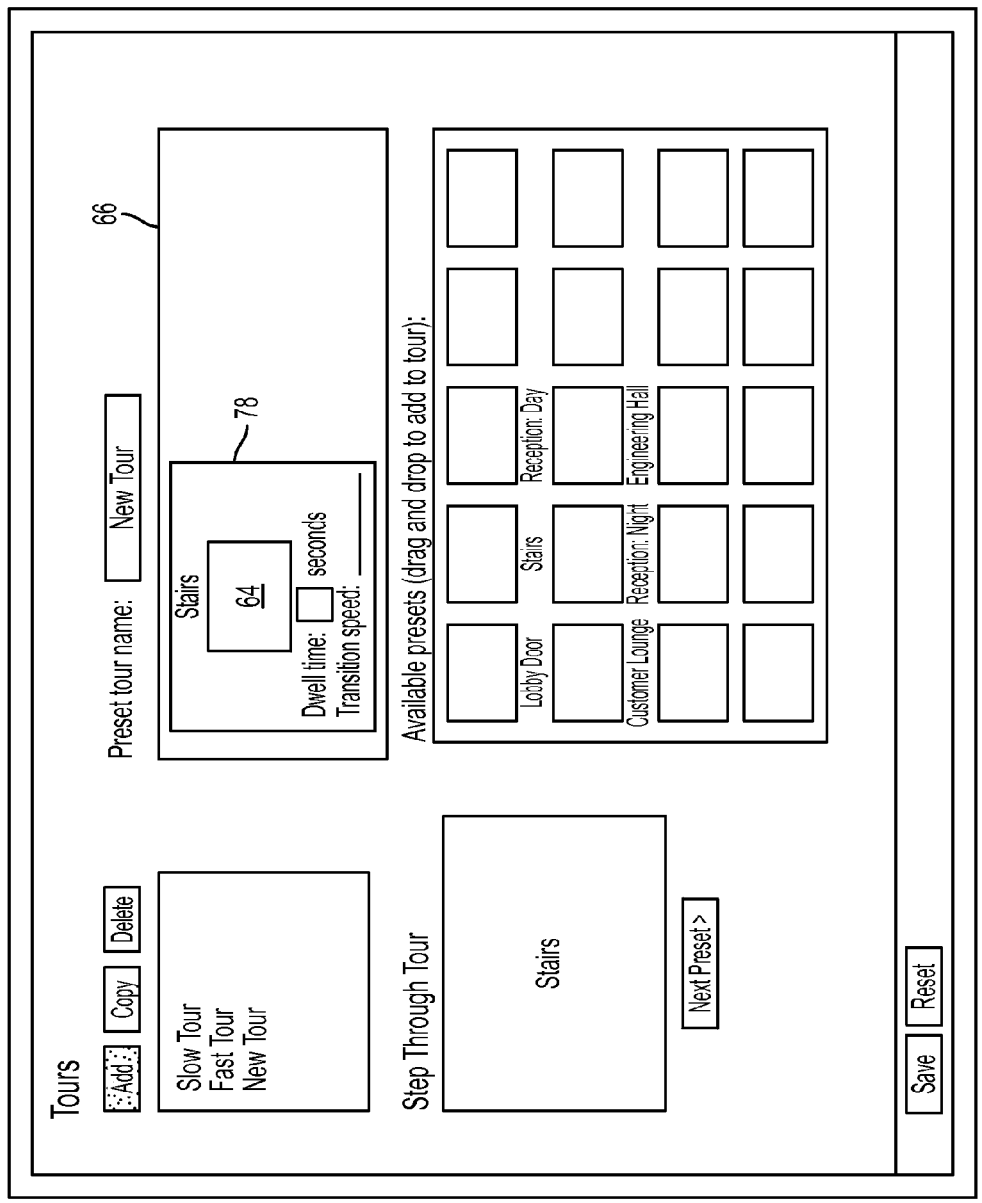
FIG. 8 is an exemplary screen shot illustrating one embodiment for configuring preset tours.

FIGS. 4-8 illustrate one mode of operation for creating a new tour. Referring to FIG. 4, window 68 indicates that currently Fast Tour is the tour being shown in window 66. Window 66 has three sub-windows 70, 72 and 74. Sub-window 70 contains preset Lobby Door indicated by thumbnail Lobby Door 62. Similarly, Sub-window 72 contains thumbnail Reception: Night 76 as the next preset, and sub-window 74 contains thumbnail Stairs 64 as the next preset. The sub-windows can be moved left or right to reveal additional presets in this tour. FIG. 5 shows in box 68 that a New Tour is being added by clicking box 78. A user can interact with the thumbnails by using a user input device. FIG. 6 shows thumbnail Stairs 64 being selected by the pointer. Thumbnail Stairs 64 has been shaded to indicate that it has been selected by a user. After selecting the preset, a user can drag and drop this preset in window 66 which is the tour working space as shown in FIG. 7. FIG. 8 illustrates the full functionality of the preset after thumbnail Stairs 64 has been dropped in window 66. Sub-window 78 contains thumbnail Stairs 64, a dwell time setting function, and a transition speed setting. Additional presets can also be added to the empty, available preset blocks in window 60. Window 66 allows a user to configure a tour such as by dragging and dropping another one of the preset thumbnails from window 60 and inserting it at the desired point in the tour.

Figure 9:
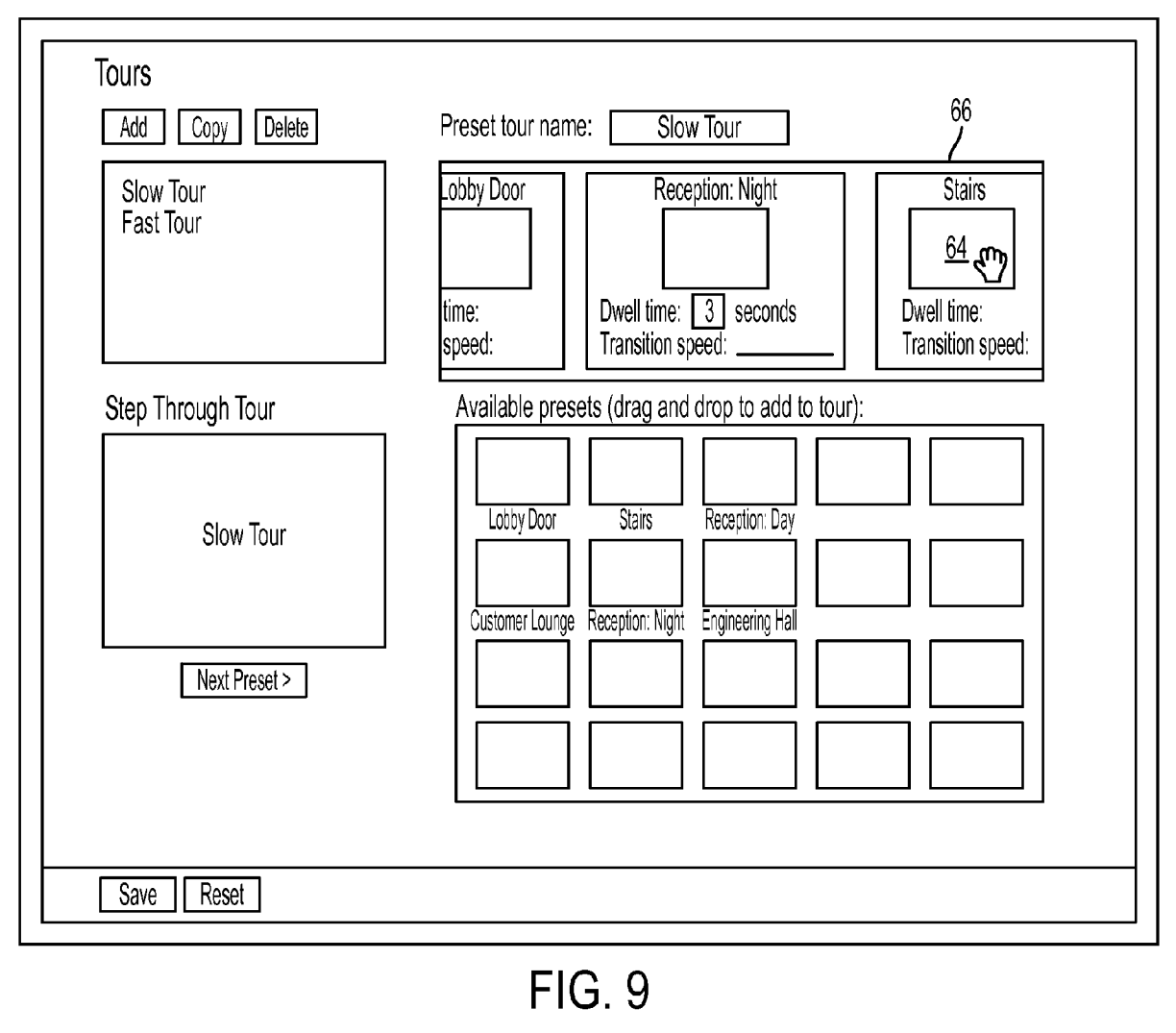
Figure 10:
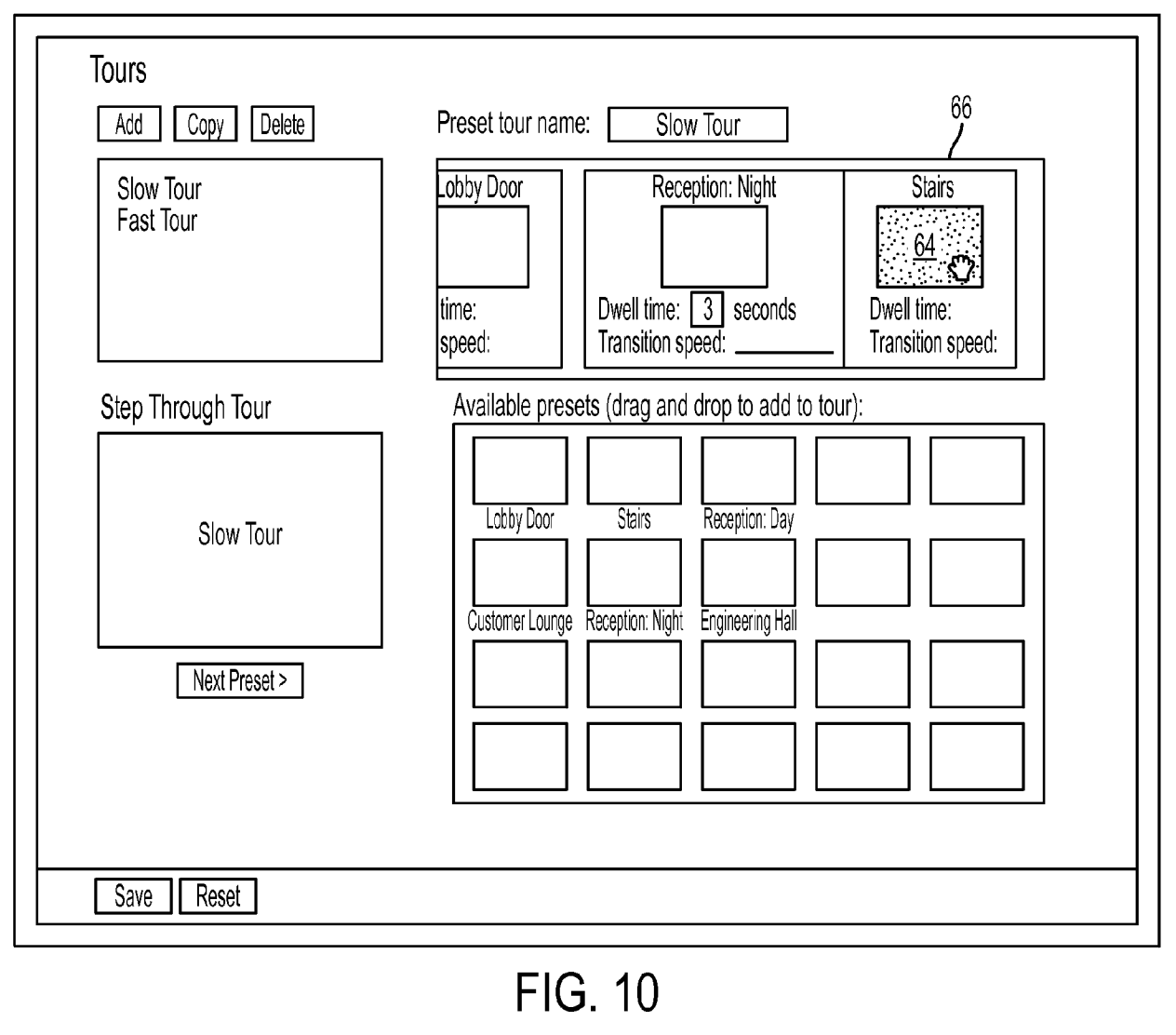
Figure 11:
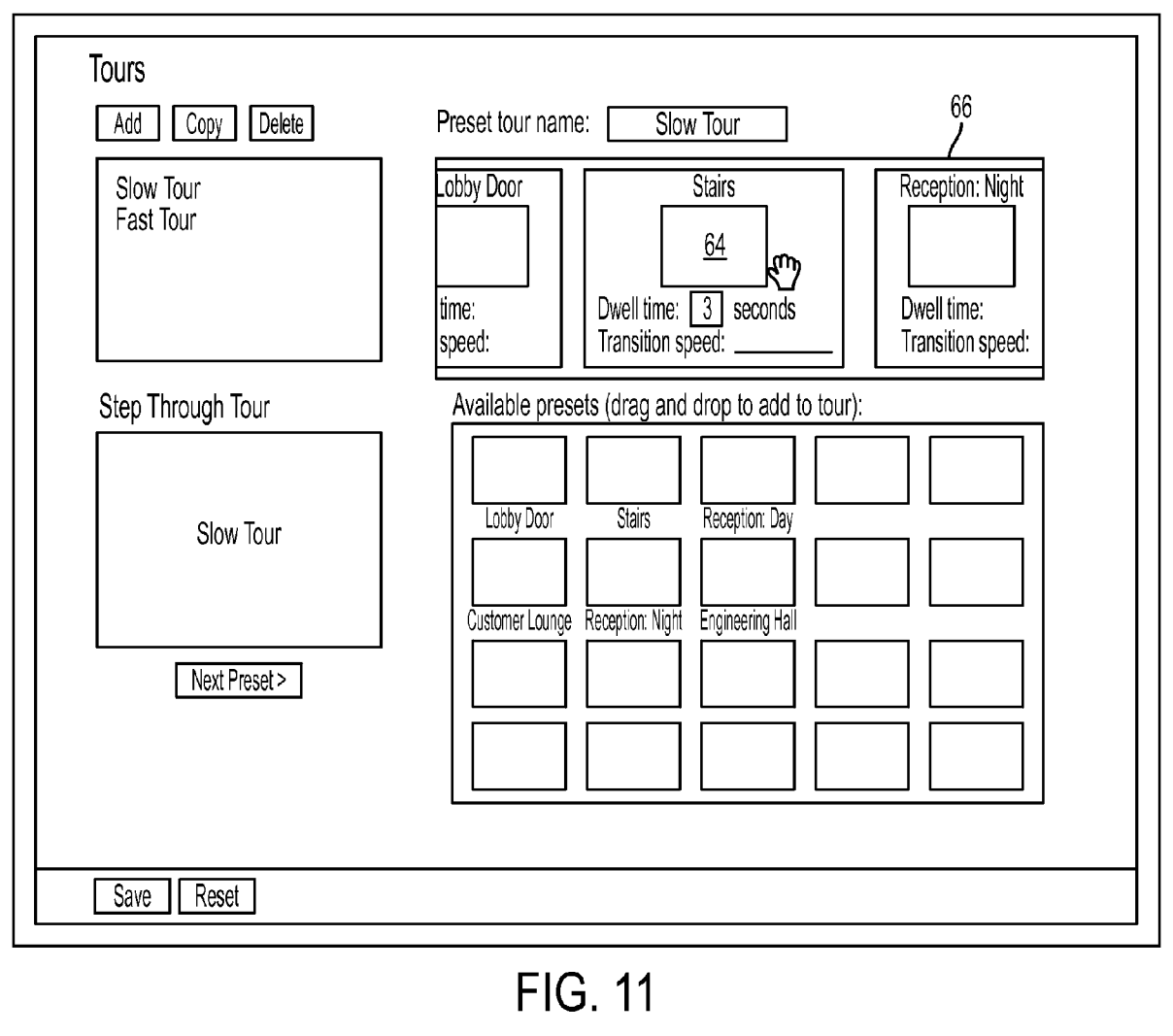

FIGS. 9-11 illustrate an exemplary embodiment of a process for changing the order of presets in a tour. FIG. 9 shows that a user has moved the pointer to the Stairs preset in window 66. In FIG. 10 the shading of thumbnail Stairs 64 indicates that a user has selected and grabbed this preset. FIG. 11 shows that a user has moved the Stairs preset between the Lobby Door preset and the Reception: Night preset.

Figure 12:
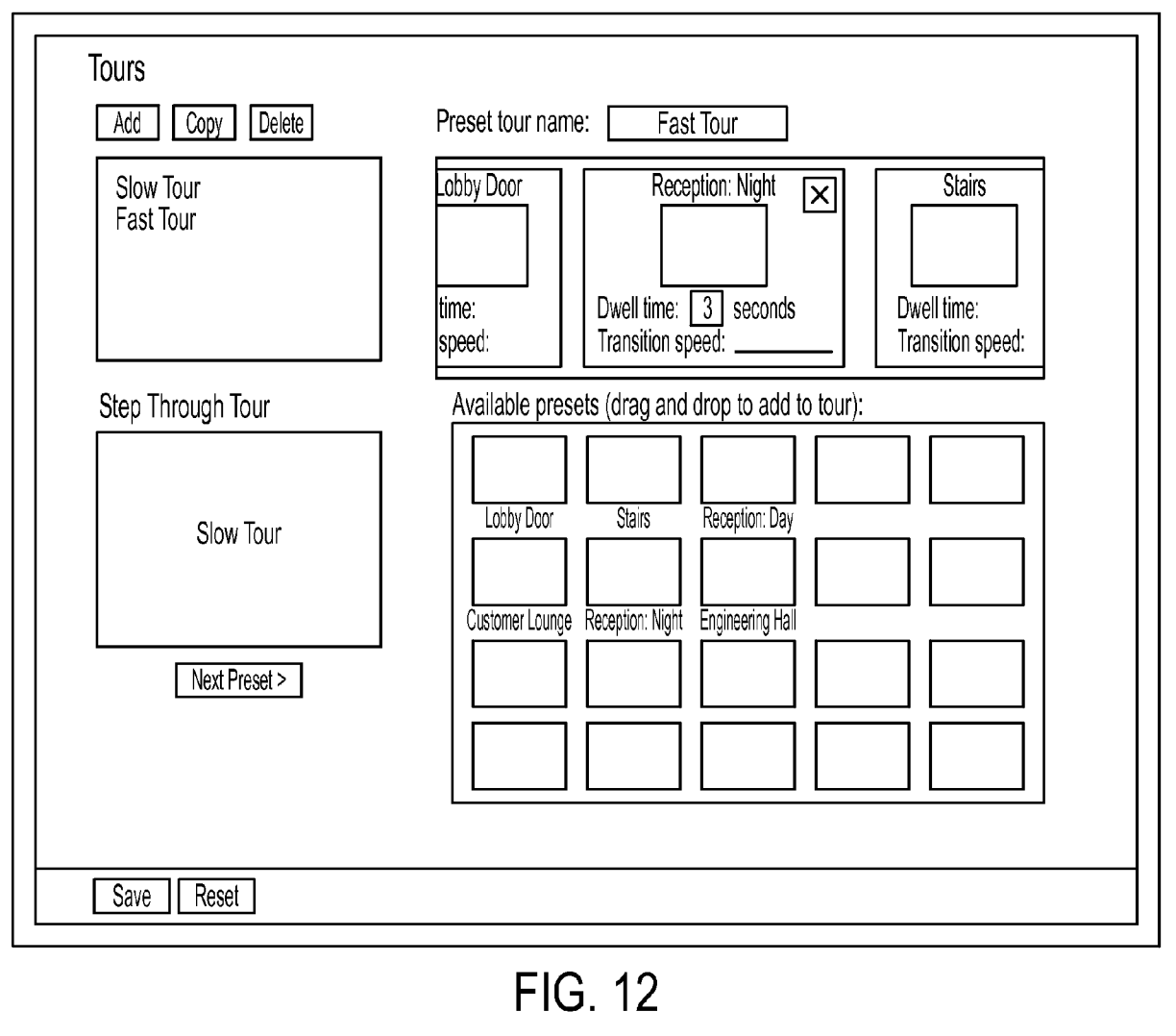
Figure 13:
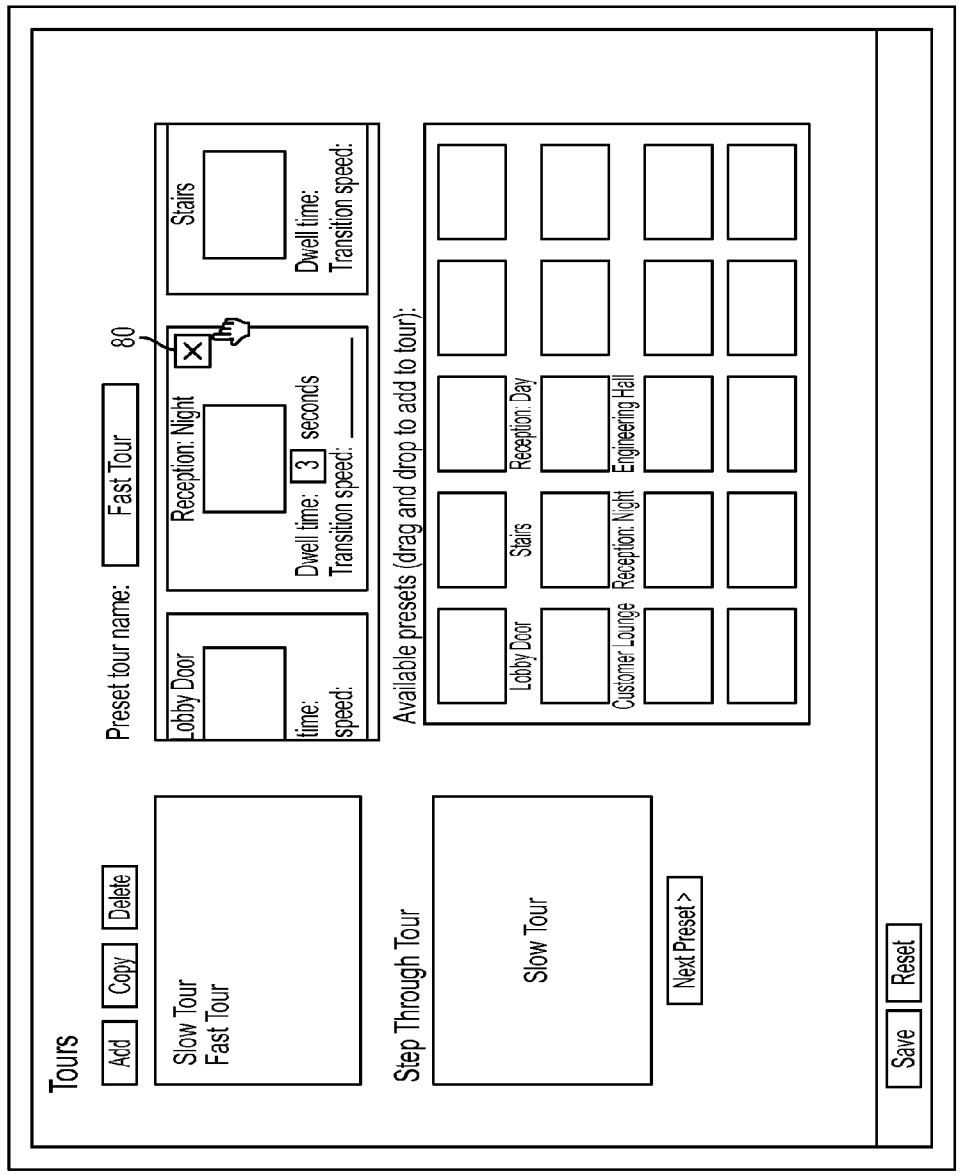
FIG. 13 is an exemplary screen shot illustrating one embodiment for configuring preset tours.
Figure 14:
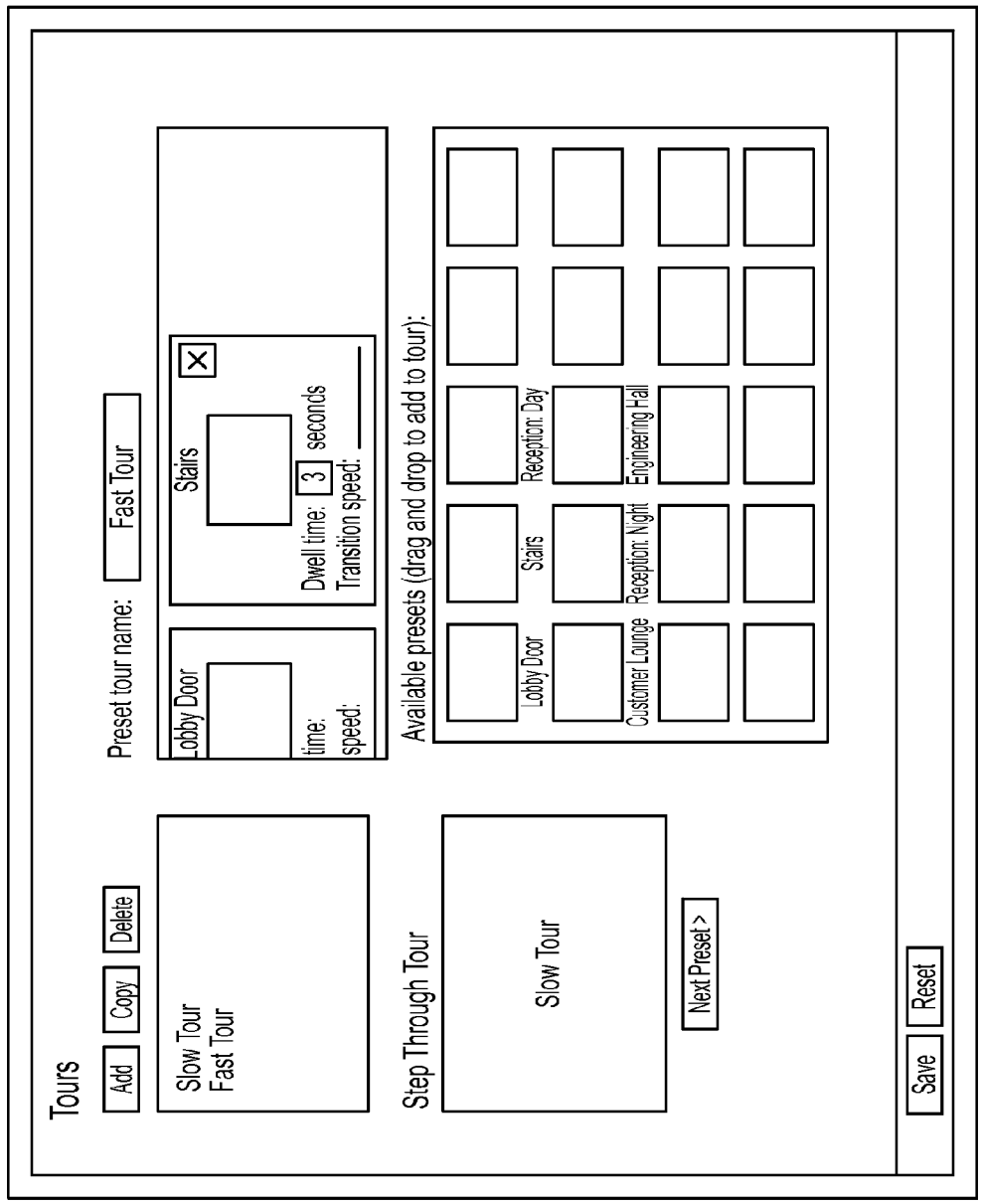
FIG. 14 is an exemplary screen shot illustrating one embodiment for configuring preset tours.

FIGS. 12-14 show an exemplary mode of operation for removing a preset from a tour. In FIG. 12 it can be seen that the tour named Fast Tour consist of the sequence of presets Lobby Door, Reception: Night, and Stairs. FIG. 13 shows that a user is moving the pointer towards box 80 to delete the Reception: Night preset. FIG. 14 shows the result where the Reception: Night preset has been deleted resulting in the tour sequence being the Lobby Door preset followed immediately by the Stairs preset.

Figure 15:
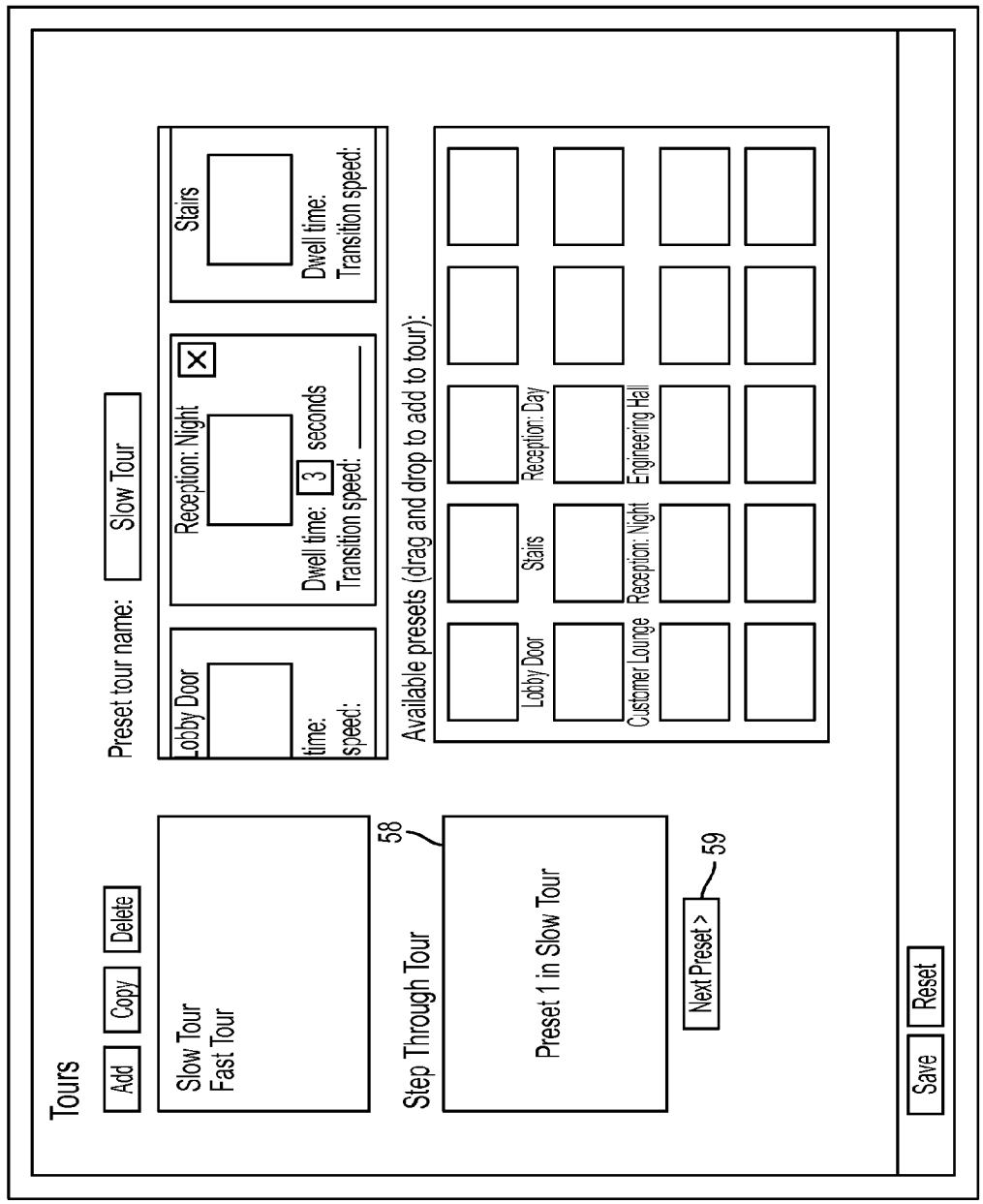
FIG. 15 is an exemplary screen shot illustrating one embodiment for configuring preset tours.
Figure 16:
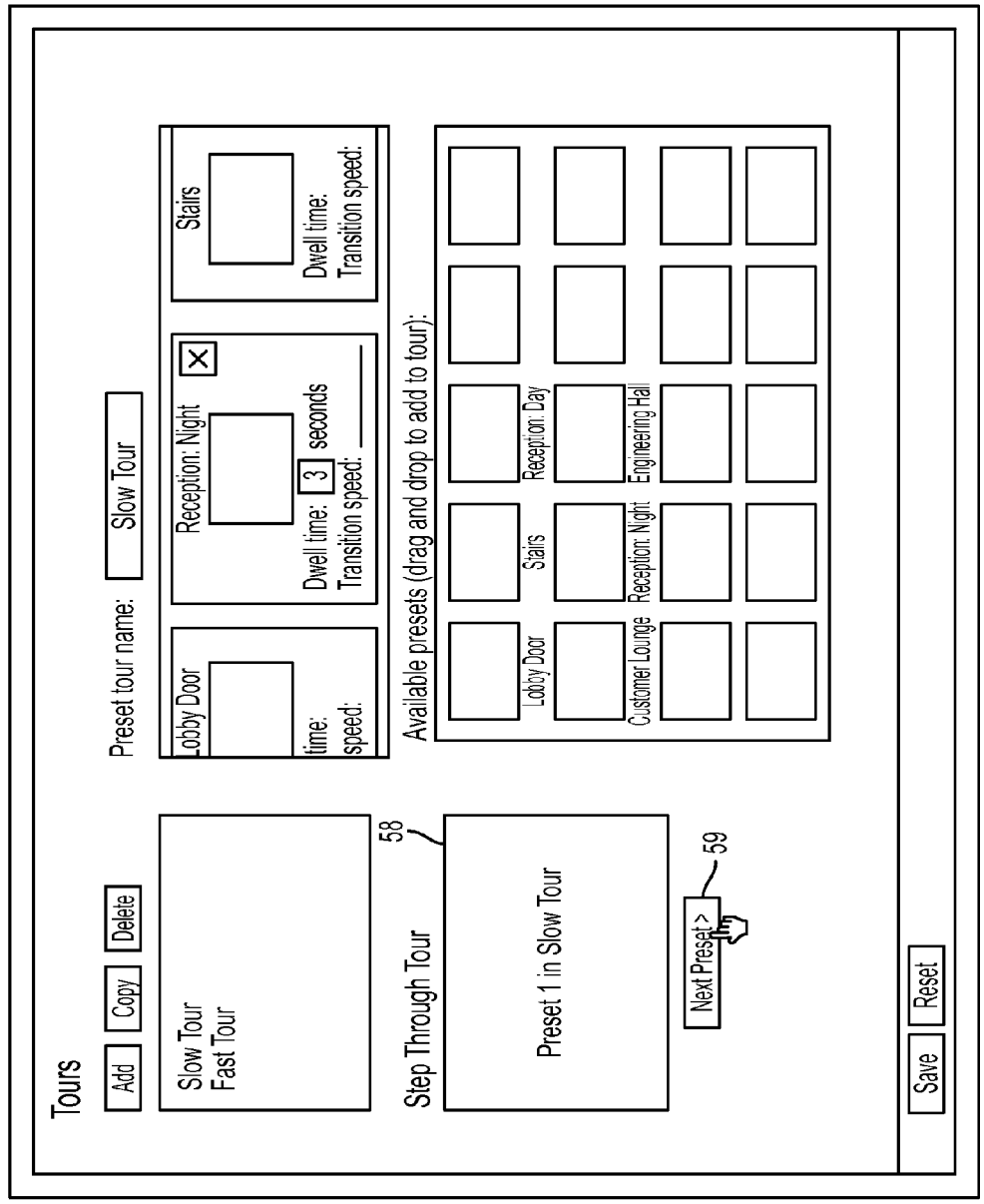
FIG. 16 is an exemplary screen shot illustrating one embodiment for configuring preset tours.
Figure 17:
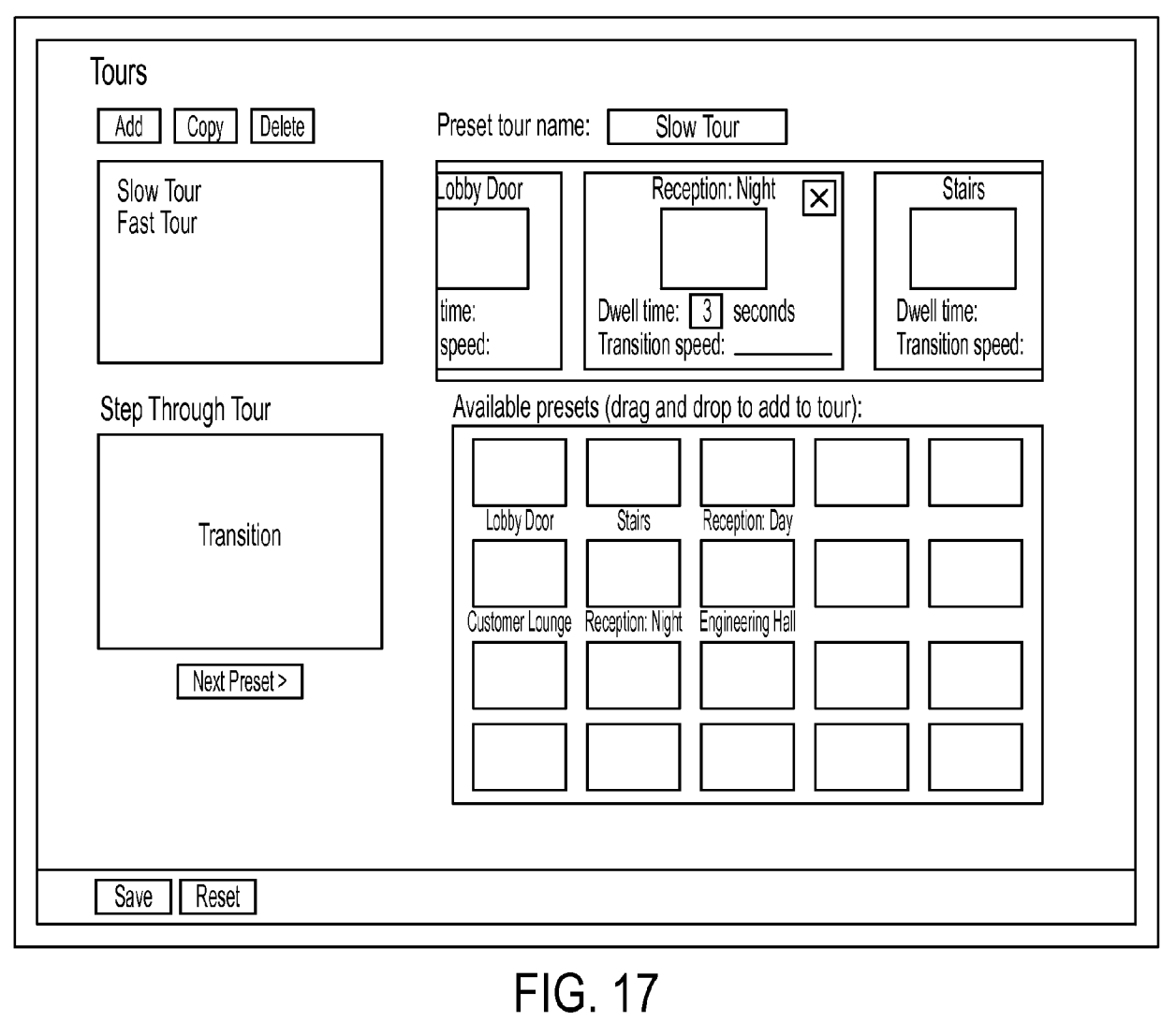
Figure 18:
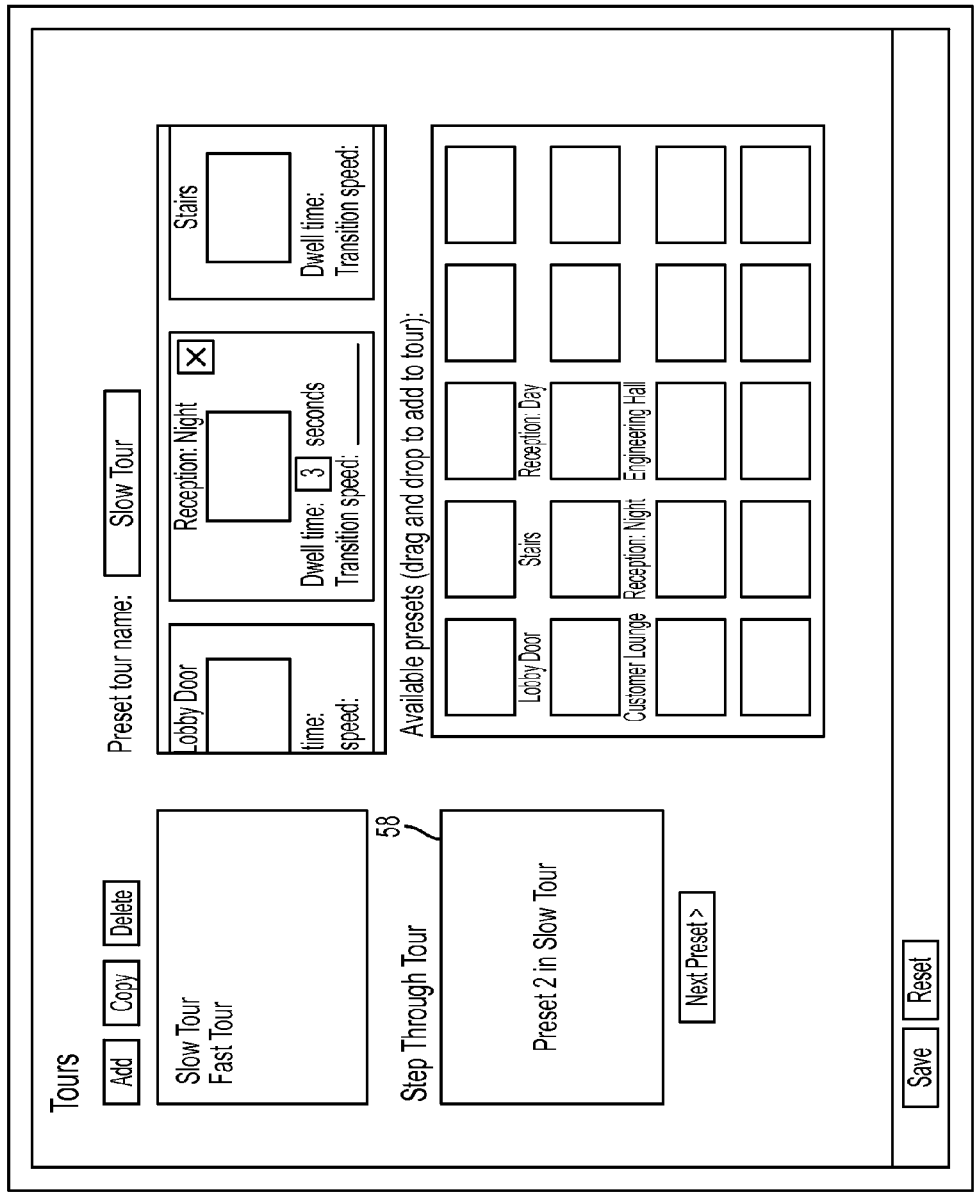
FIG. 18 is an exemplary screen shot illustrating one embodiment for configuring preset tours.
Figure 19:
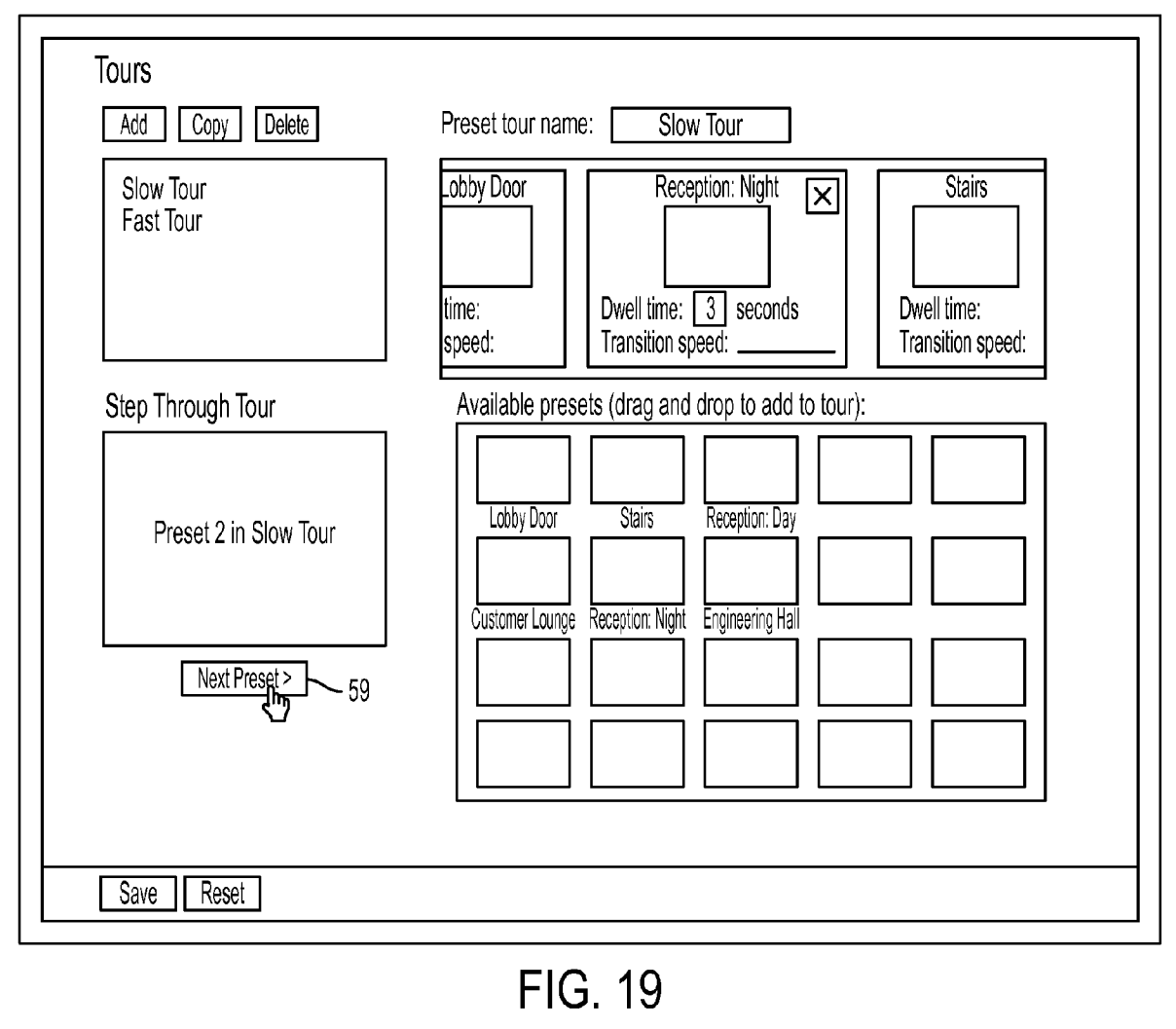
Figure 20:
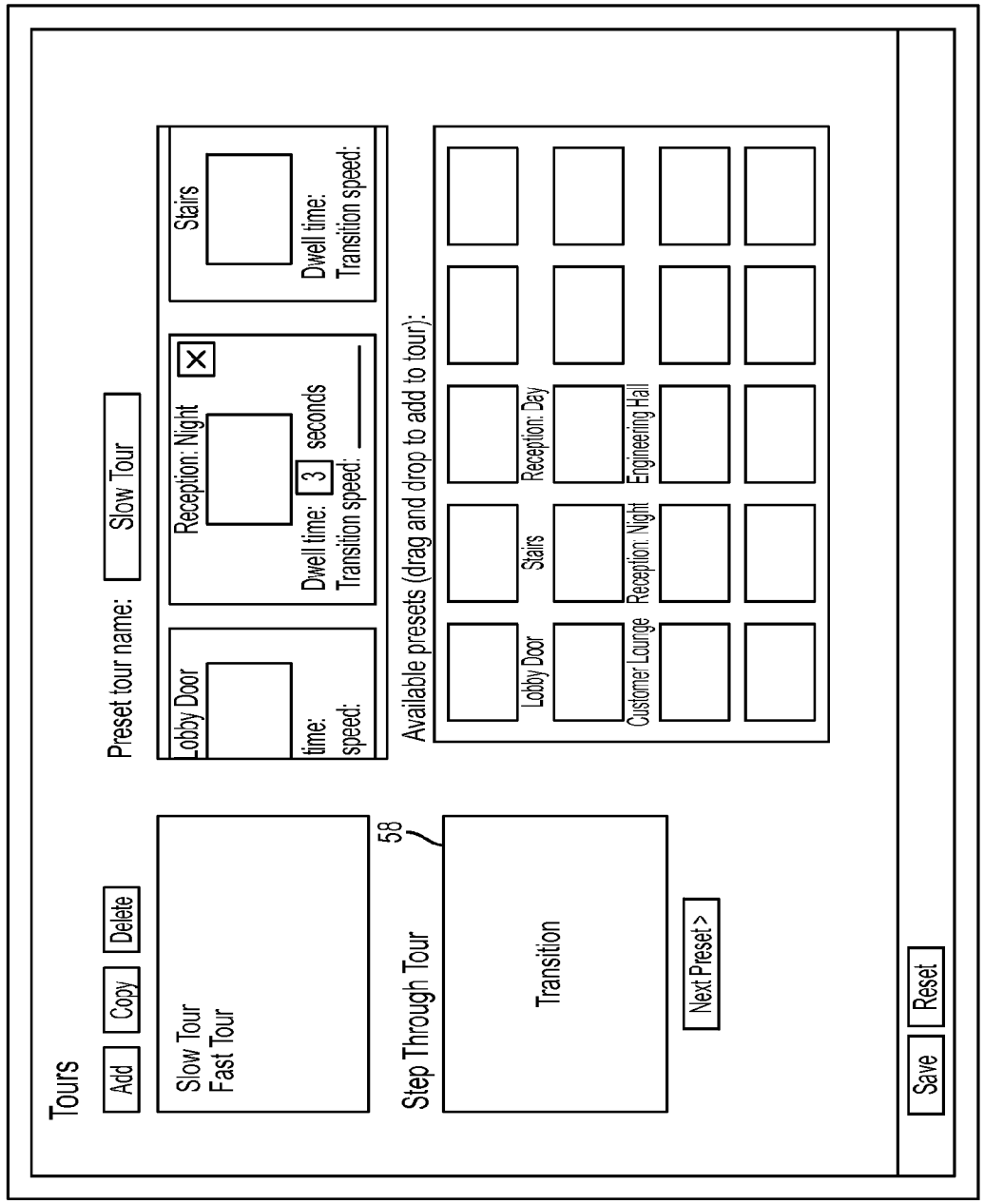
FIG. 20 is an exemplary screen shot illustrating one embodiment for configuring preset tours.
Figure 21:
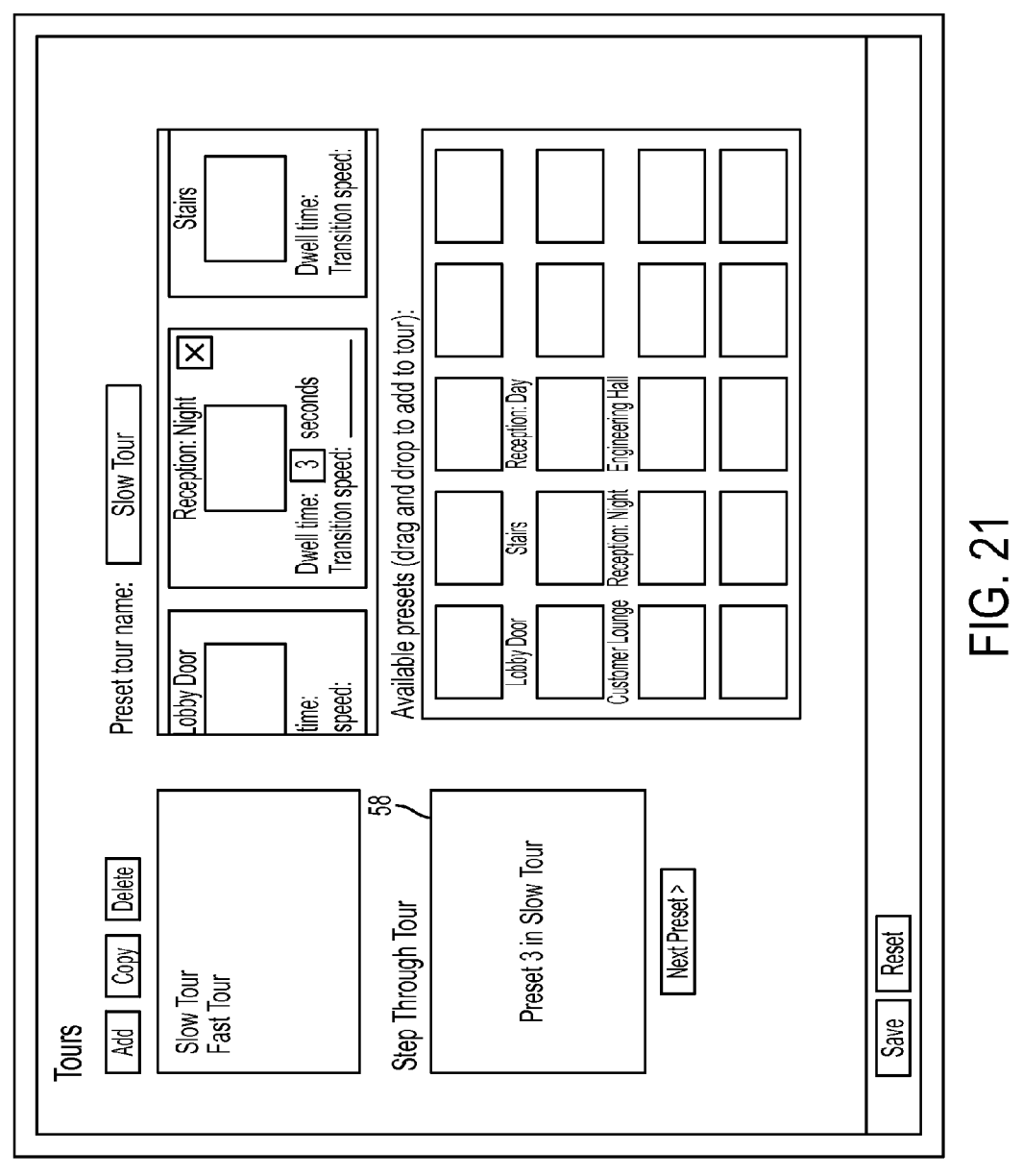

FIGS. 15-21 show the mode of operation of stepping through a tour, one preset at a time. Window 58 allows a user to step through a tour by using a mouse to select and click button 59 to get the next preset and to see the field of view of the camera. In FIG. 15 Preset 1 in Slow Tour is shown in window 58. In FIG. 16 a user is clicking box 59 by means of the pointer and mouse to get the next preset. FIG. 17 shows that there is a transition between Preset 1 and Preset 2 as the camera moves from the pan, tilt, and zoom settings for Preset 1 to the pan, tilt, and zoom settings for Preset 2. Preset 2 is shown in window 58 in FIG. 18. FIG. 19 shows a user activating button 59 again to get to the next preset. The transition is shown in window 58 in FIG. 20. Preset 3 is shown in window 58 in FIG. 21.

Aspects of the techniques and/or items described herein allow the web client to communicate with the camera to save tours, call the script that creates the thumbnails, and so forth by various transports based on the API requirements, for example, a Simple Object Access Protocol (SOAP) Application Program Interface (API). The embodiments described herein use still images, that is, thumbnail snapshots, to represent the camera's field of view; however, an alternative embodiment would use a thumbnail live stream from the camera instead of a still image. As used herein, thumbnail is intended to include both still and live streaming images.

Aspects of the techniques and/or items described herein also allow a user to see the actual view from the video camera when creating a tour (a sequence of camera positions), thereby providing the user with a visual preview. The user can move the camera to each desired preset position, save it, and then mix and match the available preset positions until the desired pattern is achieved. Then the user can adjust the timing, specifying how long each preset position should be maintained and the transition speed to the next preset.

The processes and methods described and shown herein can be stored on a non-transitory computer readable medium, which refers to any non-transitory storage device used for storing data accessible by a computer, for example, a magnetic hard disk, a floppy disk, an optical disk, such as a CD-ROM or a DVD, a magnetic tape, and a memory chip.

Although the various embodiments discussed herein have pertained to a video surveillance system, the same processes and methods can be utilized with cameras and video data captured by commercial and noncommercial systems outside of the surveillance environment.

Other examples of configuration and implementation are within the scope and spirit of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including the claims, "or" as used in a list of items prefaced by "at least one of" indicates a disjunctive list such that, for example, a list of "at least one of A, B, or C" means A or B or C or AB or AC or BC or ABC (i.e., A and B and C). In addition, it is to be understood that more than one invention may be disclosed herein.

What is claimed is:

1. A method of configuring a camera to view a sequence of positions comprising:
    displaying a graphical user interface;
    displaying a plurality of thumbnails on the graphical user interface with the plurality of thumbnails having associated respective positions of the camera and the respective thumbnails in the plurality of thumbnails providing the field of view of the camera in the respective positions;
    providing a workspace on the graphical user interface;
    enabling a user to drag and drop thumbnails to the workspace; and
    creating a tour for the camera based on the thumbnails in the workspace.

2. The method as recited in claim 1 wherein creating the tour comprises:
    creating a tour for the camera based on the thumbnails in the workspace and an order of the thumbnails.

3. The method as recited in claim 2 further comprising:
    enabling a user to drag and drop the thumbnails in the workspace to change the order of presets in the tour for the camera.

4. The method as recited in claim 2 further comprising:
    receiving input from a user to delete a selected thumbnail in the workspace and deleting the selected thumbnail in the workspace thereby deleting a preset from the tour.

5. The method as recited in claim 2 further comprising:
saving the tour based on user input.

6. The method as recited in claim 5 further comprising:
receiving user input to open a tour that has been saved and opening a tour based on the received user input by displaying thumbnails of presets in the tour in the workspace.

7. The method as recited in claim 6 further comprising:
changing the tour that has been opened based on the received user input by enabling a user to modify the preset order of the tour by dragging and dropping the thumbnails displayed in the workspace.

8. The method as recited in claim 6 further comprising:
adding a preset to the tour that has been opened based on the received user input by enabling a user to drag and drop a thumbnail displayed on the graphical user interface in the workspace.

9. The method as recited in claim 6 further comprising:
removing a preset from a tour that has been opened based on the received user input by receiving user input indicating which thumbnail in the workspace has been selected by the user.

10. A system for configuring a camera to view a sequence of positions comprising: a processor, a display connected to the processor, an input/output device adapted to communicate with a camera, and a user input device, the processor being adapted to:
generate a signal to display a graphical user interface on the display with a plurality of thumbnails associated with a camera in communication with the input/output device, the thumbnails having associated respective positions of the camera and the thumbnails providing the field of view of the camera in the respective positions,
provide a workspace on the graphical user interface, and
enable a user to use the user input device to drag and drop thumbnails in the workspace thereby creating a tour for the camera based on the thumbnails in the workspace.

11. The system as recited in claim 10 wherein the processor is adapted to create a tour for the camera based on an order of the thumbnails in the workspace.

12. The system as recited in claim 11 wherein the processor enables a user to use the user input device to drag and drop the thumbnails in the workspace thereby changing the order of presets in the tour for the camera.

13. The system as recited in claim 11 wherein the processor is adapted to delete a preset from the tour in response to a preset being selected by a user and an indication that the preset should be deleted.

14. The system as recited in claim 11 wherein the processor is adapted to open a tour and enable a user to modify the tour by using the user input device.

15. A non-transitory computer readable medium comprising instructions configured to cause a processor to:
display a graphical user interface;
display a plurality of thumbnails on the graphical user interface with the plurality of thumbnails having associated respective positions of the camera and the respective thumbnails in the plurality of thumbnails providing the field of view of the camera in the respective positions;
provide a workspace on the graphical user interface;
enable a user to drag and drop thumbnails to the workspace; and
create a tour for the camera based on the thumbnails in the workspace.

16. The non-transitory computer readable medium as recited in claim 15 wherein the instructions to create a tour for the camera based on the thumbnails in the workspace comprise instructions configured to cause the processor to create a tour for the camera based on the thumbnails in the workspace and an order of the thumbnails.

17. The non-transitory computer readable medium as recited in claim 15 further comprising instructions configured to cause the processor to enable a user to drag and drop the thumbnails in the workspace to change an order of presets in the tour for the camera.

18. The non-transitory computer readable medium as recited in claim 15 further comprising instructions configured to cause the processor to receive input from a user to delete a selected thumbnail in the workspace and to delete the selected thumbnail in the workspace thereby deleting a preset from the tour.

19. The non-transitory computer readable medium as recited in claim 15 further comprising instructions configured to cause the processor to receive user input to open a tour and to open a tour based on the received user input by displaying thumbnails of presets in the tour in the workspace.

20. The non-transitory computer readable medium as recited in claim 19 further comprising instructions configured to cause the processor to enable a user to modify a tour that has been opened by interacting with the thumbnails in the workspace.

* * * * *